Aug. 2, 1955    J. A. BOSTON    2,714,358
CROSS GRAIN MOLDER

Filed Jan. 15, 1954    2 Sheets-Sheet 1

INVENTOR.
John A. Boston
BY
Otto Moeller
Attorney

Aug. 2, 1955  J. A. BOSTON  2,714,358
CROSS GRAIN MOLDER
Filed Jan. 15, 1954  2 Sheets-Sheet 2

INVENTOR.
John A. Boston
BY
Otto Moeller
Attorney

United States Patent Office

2,714,358

Patented Aug. 2, 1955

2,714,358

CROSS GRAIN MOLDER

John A. Boston, York, Pa., assignor to Read Standard Corporation, New York, N. Y., a corporation of Delaware Application January 15, 1954, Serial No. 404,295

5 Claims. (Cl. 107—12)

My invention relates to improvements in dough molding machines, in which individual sheeted pieces of dough received from one or more sets of sheeting rolls, are subjected to a final molding operation in a direction normal to the travel of the dough pieces through the sheeting rolls, whereby the final molding operation is across the grain, which develops in the dough as a result of the initial sheeting of the dough pieces.

In such machines, it has been customary to provide an endless traveling belt arranged to receive the sheeted dough pieces from the sheeting rolls and transport the sheeted dough pieces therefrom in the same direction as the direction of travel of the dough through the sheeting rollers; and to provide a second endless traveling belt disposed at the delivery end of the first belt and disposed at right angles with respect thereto, whereby the dough sheet is projected from the first belt to the second belt and is then transported to the final molding means in a direction at right angles to its direction of travel through the sheeting rollers. The final molding means generally includes a chain-like mat cooperating with the second belt, for rolling up or coiling the dough sheet into the form of a scroll.

In order to orient the dough sheets on the second belt, for subsequent passage beneath the curling belt and pressure board and delivery to the pans of a pan conveyor, it has been customary to provide a rigid stop member disposed above the second belt and in the path of the dough sheets projected from the first belt. For convenience in distinguishing these conveyor belts, the second belt will be hereinafter referred to as the molding belt conveyor and the first belt will be referred to as the discharge belt conveyor. Such a rigid stop member causes a thickening of that edge of the dough sheet that engages the stop member and results after subsequent coiling and molding in a loaf, one end of which is larger in cross section than the other.

It is the main object of my invention to provide a molding machine of the cross grain type described above, that avoids or materially minimizes the formation of a thickened end portion in the molded loaf, and assures a loaf of substantially uniform cross section from end to end.

More specifically the invention has for its object the provision of improved, simple and practical transfer means for transferring the dough sheet from the discharge belt conveyor to the molding belt conveyor comprising stop means for orienting the dough sheet on the molding belt conveyor that minimizes impact of the dough sheet with the stop means as the dough sheet is projected from the discharge conveyor belt, whereby to avoid or materially minimize thickening of the edge of the dough sheet that engages the stop means.

A further object of the invention is to provide a stop means of the type indicated that is yieldable when engaged by the leading edge of a dough sheet projected from the discharge belt conveyor, and that includes means for adjusting the degree of yieldability of the stop means to insure consistent orientation of the dough sheets on the molding belt conveyor for different speeds thereof and for different weights of dough sheets.

The construction and operation of my improved cross grain dough molding means by which the above and other objects and advantages are attained, will be readily understood from the following description in which reference is made to the accompanying drawings.

Figure 1:
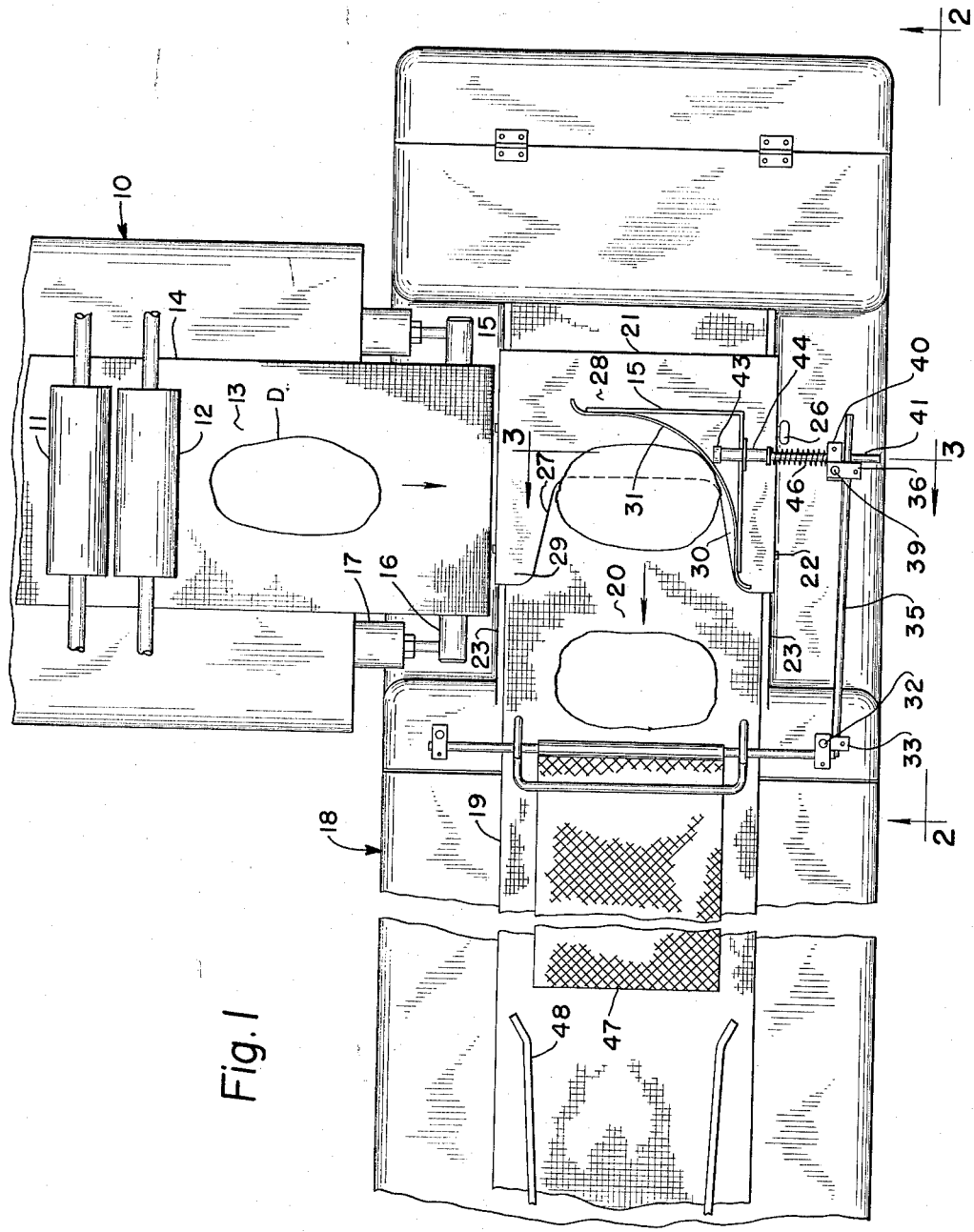
Figure 1 is a top plan view of the adjacent ends of the dough sheeting and final molding units of a dough molder, only so much of these units being shown as is essential to an understanding of the invention.
Figure 2:
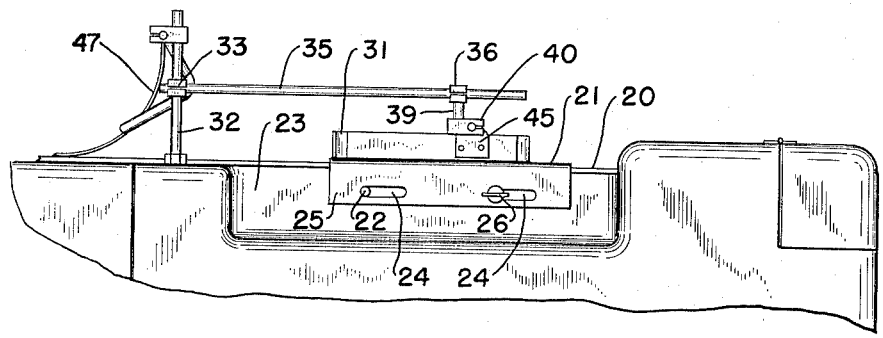
Figure 2 is a fragmentary end view in elevation taken on the line 2—2 of Figure 1.
Figure 3:
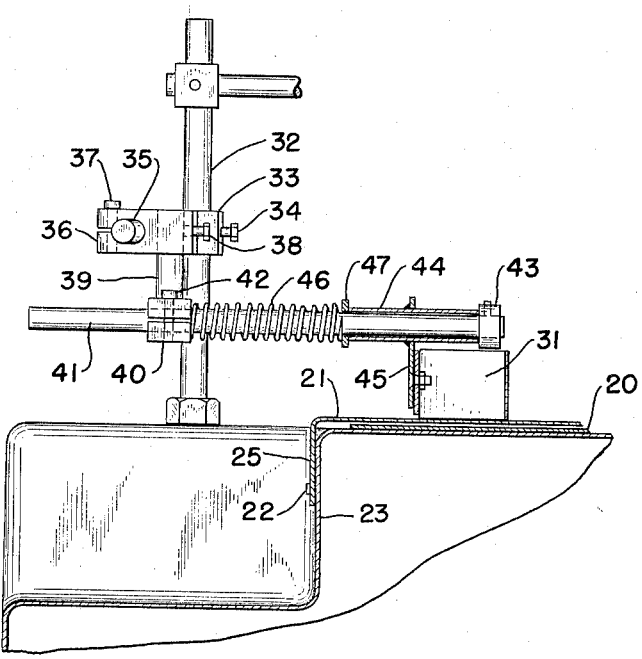
Figure 3 is a sectional view taken on the line 3—3 of Figure 1, parts being shown in elevation.

Referring to Figure 1, the numeral 10 designates the dough sheeting unit of the molder, only so much of it being shown as is necessary to a complete understanding of the invention. Such dough sheeting units are well known in the art and comprise one or more pairs of cooperating rolls through which lumps of dough, of the proper weight for producing loaves of bread, are passed to sheet them into flat oval or elliptical pancake shape. One pair of such rolls is illustrated and the individual rolls are numbered 11 and 12, respectively. Additional sets of rolls may and preferably are employed, as is customary in such devices, for sheeting the dough pieces.

From the sheeting rolls 11 and 12, the now sheeted dough pieces are deposited or guided onto the upper run 13 of an endless belt conveyor 14, hereinafter referred to as the discharge belt conveyor, disposed below the sheeting rolls, and traveling in the direction indicated by the arrow. The belt conveyor 14 is mounted at its forward end on a roller 15 carried by the shaft 16 which is suitably journaled in a bearing support means, designated as a whole by the numeral 17, disposed at the forward end of the sheeting unit 10. The opposite end of the discharge belt conveyor 14 is mounted on another roller, not shown, and may be driven in a manner conventional in the art. The sheeted dough piece, indicated by the letter D, is conveyed to the forward end of the unit 10 in the same direction as the dough pieces pass through the sheeting rolls, in other words, they are conveyed in the direction of the grain which develops in the dough sheet as a result of the sheeting operation.

From the discharge belt conveyor 14 the sheeted dough pieces are projected onto the final molder unit, designated as a whole by the numeral 18. On this unit 18, several operations may be successively performed on the dough sheets before they are delivered to the pans of an automatic panner, such panners being well known in the art, are not shown in the drawings. The first of these operations is a coiling operation, whereby the dough sheets are rolled up or coiled into the form of a scroll. In what is commonly known as cross graining, the dough sheet is coiled in a direction transverse, preferably at 90°, to the direction of travel of the dough pieces through the sheeting rolls 11, 12.

In order to accomplish this cross graining, the unit 18 is disposed at right angles to the unit 10, with its receiving or rearward end adjacent the delivery or forward end of the unit 10. An endless belt conveyor 19, hereinafter referred to as the molding belt conveyor, is mounted on and extends longitudinally of the unit 18, being trained around rollers, not shown, at the rearward end of the unit 18 and the forward end thereof, respectively. Suitable means, well known in the art and therefore not shown, is provided for driving the molding belt conveyor 19, so that the upper run 20, travels in the direction indicated by the arrow. The upper run 20 of molding belt conveyor 19 thus travels at right angles with respect to the direction of travel of the upper run 13 of discharge belt conveyor 14.

The conveyors 14 and 19 are arranged so that the top surface of the upper run 20 of conveyor 19 is slightly below the level of the top surface of the upper run 13 of conveyor 14, and the side of the rearward portion of the upper run 20 of conveyor 19 is closely adjacent the forward or discharge end of the conveyor 14.

A flat plate 21 is mounted over that portion of the upper run 20 of conveyor 19 opposite the delivery end of the conveyor 14, with just sufficient clearance between the plate 21 and conveyor run 20 to permit the conveyor to operate freely. The plate 21 is supported by pins 22 suitably secured to and projecting laterally from the indented upright side wall portions 23 of the unit 18, and which pins extend through horizontal slots 24 in the depending side flanges 25 of the plate 21. The horizontal slots 24 permit the plate 21 to be adjusted lengthwise of the conveyor 19, in any one of a number of positions with respect to the delivery end of the conveyor 14, to accommodate various size dough sheets. One or more of the pins 22 are threaded at their outer ends to receive wing nuts 26, whereby the plate 21 may be secured in adjusted position.

The various parts are so arranged that when the plate 21 is in position, its top surface will be slightly below the level of the top surface of the upper run 13 of conveyor 14, so that dough sheets projected from the conveyor 14 move on and across the plate 21. The plate 21 is provided midway in its forward edge with a generally U-shaped indentation 27. The plate thus formed, has a transverse rearward portion 28 extending the full width of the conveyor 19 and similar wing portions 29 and 30 extending forwardly of transverse portion 28.

The portion of the plate 21 adjacent the delivery end of conveyor 14, which includes the wing portion 29, should have a longitudinal extent sufficient to provide a support or guide for substantially the width of the dough sheets transported along and projected from the upper run 13 of the conveyor 14. The depth of the indentation 27 in the plate 21 is such that the rearward half of the dough sheet, or slightly less than half, in respect of its position relative to the conveyor 19, will be supported on the plate portion 28.

A stop plate 31 extends across the path of the dough sheets projected from the conveyor 14 and is supported immediately above the plate 21, as hereinafter described. The stop plate 31 orients the projected dough sheets on the conveyor 19 and plate 21. While the stop plate 31 may be made straight, substantially parallel with the side edges of the molding belt conveyor 19, it is preferably of curviform, extending in a generally transverse direction with respect to belt conveyor 19 along the rearward portion of the plate 21 and then curving forwardly and extending longitudinally of the belt conveyor 19 along the wing portion 30 of the plate 21. The curved form of the stop plate 31 assists in initiating the forward movement of the dough sheet providing a smooth, unhesitating movement to the dough sheet, as it changes its direction of travel.

Adjustable means is provided for adjusting the stop plate 31 in any one of a number of positions longitudinally and laterally of the plate 21 and conveyor 19, for proper orientation of different size dough sheets. For this purpose, an upright post 32, circular in cross section, is mounted on unit 18 at one side of the conveyor 19 and forward of the plate 21. A clamping block 33 is mounted on the standard 32 and is arranged to be secured thereto in any one of a number of positions circumferentially or vertically by a set screw 34, or other suitable locking means. A rod 35 is received at one end in the block 33 and extends rearwardly therefrom along one side of the plate 21, and at its free end is arranged to support the stop plate 31, by means to be described.

At its free end, the rod 35 extends through a clamping block 36. A lock screw 37 threaded into the jaws of the clamping block 36 permits securing of the clamping block 36 and rod 35 in any one of a number of relatively adjustable positions. The clamping block 33 and other clamping blocks, to be referred to, are similarly provided with lock screws. Adjustably secured in the clamping block 36 by a set screw 38 is a depending rod 39 which carries a clamping block 40 at its lower end. Projecting through the clamping block 40 and extending toward and over the plate 21 is a rod or arm 41, and a lock screw 42 is arranged for securing the rod 41 in any one of a number of positions.

Secured on the free end of the rod 41 is a collar 43 constituting a stop member for a sleeve 44 slidably mounted on the rod 41. A bracket 45 depends from and is rigidly secured in any suitable manner, as by welding, to the sleeve 44, and the curviform stop member 31, previously described, is securely supported in suitable manner by the bracket 45. A light spring 46, mounted on the rod 41, has one end in engagement with the clamping block 40 and the other end in engagement with a flange 47 of the sleeve 44, whereby the stop plate 31 is normally maintained in the position as shown in the drawings.

In operation, it is apparent from the above description, that upon engagement of a dough sheet, projected from the conveyor 14, with the stop plate 31, the latter will yield by compression of the spring 46, thus effecting a braking action on the projected dough piece, minimizing the impact and thereby minimizing or eliminating the thickening of the dough sheet along that edge in engagement with the stop plate 31, and this is an important feature of the invention.

As the dough sheet is now carried forwardly by the top run 20 of the conveyor 19 in a direction normal with respect to its direction of travel along the top run 13 of belt conveyor 14, and is coiled by passage beneath the curling mat 47, the coiled dough piece will have a substantially uniform cross sectional area from end to end.

The dough sheets are substantially uniformly oriented on the belt conveyor 19 since for any particular speed of the belt conveyor 14 and weight of dough piece, the yielding of the stop plate 31 will be substantially the same. If the speed is increased, for example, should it be desired to change from a run of 60 pieces a minute to 80 pieces a minute, or if the weight of the dough pieces is changed, for example should the run be changed from pound to pound and a half loaves, the stop plate 31 may be moved as a whole closer or farther away from the discharge end of the belt conveyor 14 by means of the adjustable clamping block arrangement, previously described, or the yieldability of the stop plate 31 may be altered by adjustment of the clamping block 40 and rod 41 to change the extent of compression of the spring 46, or a combination of both these means of adjustment may be used if desired.

Thus orientation of the dough sheets on the belt conveyor 19 is provided for whereby the dough sheets are properly located for subsequent molding operations and automatic panning. Slight dislocations of the dough sheets may be corrected by means of suitable diverging guide members 48, which may, of course, be extended from the position shown in the drawings.

I claim:

1. A dough molder including, a discharge conveyor for sheeted pieces of dough, a molding belt conveyor traveling in a direction transverse with respect to the direction of travel of said discharge conveyor and being disposed to receive sheeted pieces of dough projected crosswise thereof from said discharge conveyor, a stop member overlying said molding belt conveyor across the path of sheeted dough pieces projected from said discharge conveyor, supporting structure for said stop member including an arm over and extending in a direction crosswise of said molding belt conveyor and means carried by said arm for movement axially therealong pendently supporting said stop member for movement therewith, and resilient means carried by said supporting structure cooperating with said last named means to effect yieldable movement of said stop member upon engagement therewith of sheeted dough pieces projected from said discharge conveyor.

2. The combination defined in claim 1 wherein said supporting structure includes means for adjusting the normal location of said stop member to any one of a number of positions crosswise of said molding belt conveyor.

3. A dough molder including a discharge conveyor for sheeted pieces of dough, a molding belt conveyor traveling in a direction transverse with respect to the direction of travel of said discharge conveyor and being disposed to receive sheeted pieces of dough projected crosswise thereof from said discharge conveyor, a stop member overlying said molding belt conveyor across the path of sheeted dough pieces projected from said discharge conveyor, and means for yieldably supporting said stop member including a standard on said molder at one side of said molding belt conveyor, an arm secured at one end to said standard and projecting therefrom in a direction crosswise of said molding belt conveyor, a sleeve slidably mounted on said arm, means for securing said stop member to said sleeve, resilient means having one end bearing against said sleeve and having its other end bearing against a stationary part of said support for urging said stop member in a direction opposite the direction of travel of the sheeted pieces of dough projected from said discharge conveyor.

4. A dough molder including, a discharge conveyor for sheeted pieces of dough, a molding belt conveyor traveling in a direction transverse with respect to the direction of travel of said discharge conveyor and being disposed to receive sheeted pieces of dough projected crosswise thereof from said discharge conveyor, a stop plate overlying said molding belt conveyor across the path of sheeted dough pieces projected from said discharge conveyor, a supporting arm for said stop plate, said stop plate being mounted for slidable movement along said arm crosswise of said molding conveyor toward and away from the discharge end of said discharge conveyor, a stop member on said arm limiting movement of said stop plate toward said discharge conveyor, a coil spring about said arm normally urging said stop plate toward said discharge conveyor and providing yielding movement of said stop plate away from said discharge conveyor upon engagement therewith of sheeted dough pieces projected from said discharge conveyor.

5. The combination defined in claim 4 including means on said arm for adjusting said resilient means.

References Cited in the file of this patent
UNITED STATES PATENTS

| 2,604,057 | Rhodes | July 22, 1952 |
| 2,647,612 | Sticelber | Aug. 4, 1953 |